(No Model.)
D. HINESLEY.
FENCE POST.
No. 482,637. Patented Sept. 13, 1892.
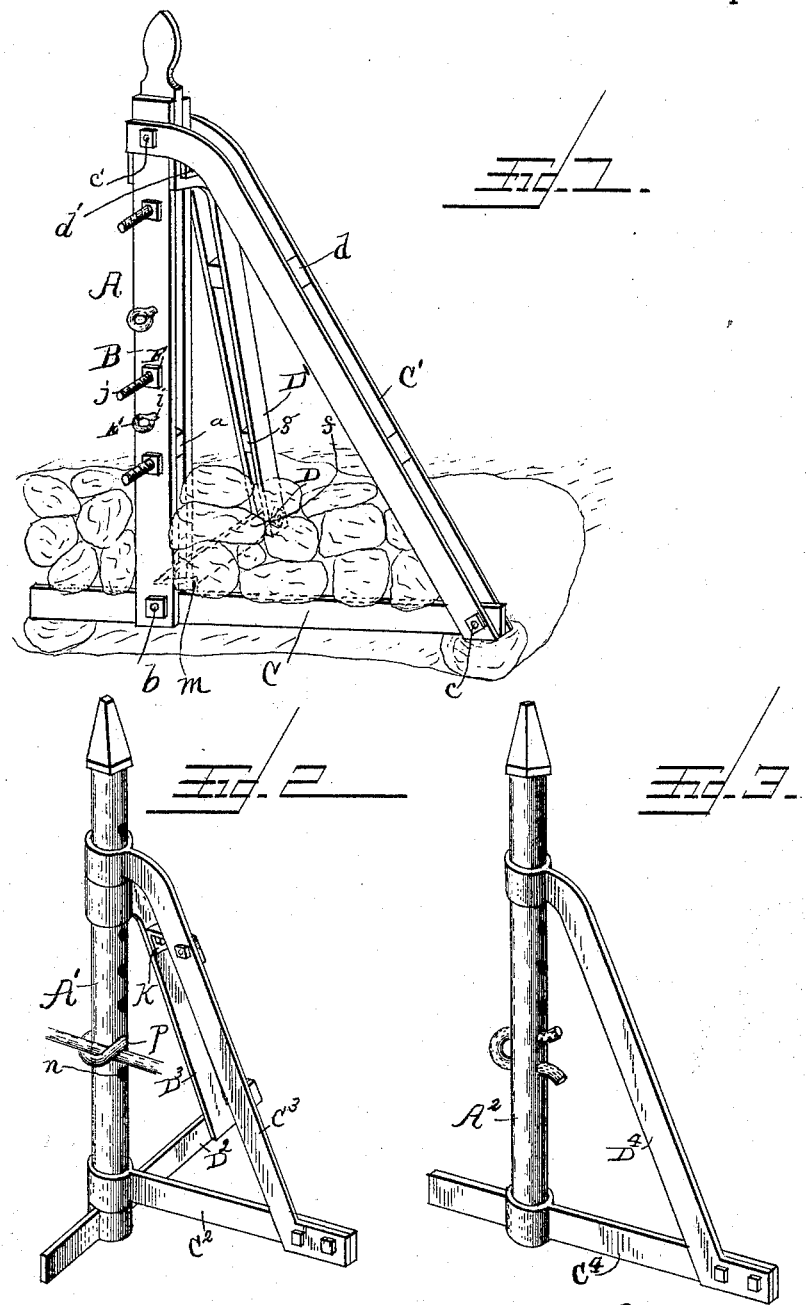

UNITED STATES PATENT OFFICE.

DANIEL HINESLEY, OF BEARD, INDIANA.

FENCE-POST.

SPECIFICATION forming part of Letters Patent No. 482,637, dated September 13, 1892.

Application filed April 28, 1892. Serial No. 431,017. (No model.)

*To all whom it may concern:*

Be it known that I, DANIEL HINESLEY, a citizen of the United States, residing at Beard, in the county of Clinton and State of Indiana, have invented certain new and useful Improvements in Fence-Posts; and I do hereby declare the following to be a full, clear, and exact description of the invention, such as will enable others skilled in the art to which it appertains to make and use the same.

My invention has relation to improvements in fence-posts; and it consists in the peculiar construction, certain novel combinations, and the adaptation of parts hereinafter described, and particularly pointed out in the claims appended.

In the accompanying drawings, Figure 1 is a perspective view of my improved fence-post, showing the manner of planting and anchoring the same in the ground. Fig. 2 is a similar view of a modified construction of post, and Fig. 3 is a similar view of another modified construction.

Referring by letter to the said drawings, and more particularly to Fig. 1 thereof, A indicates the upright of my improved post, which is preferably formed of wrought-iron and which comprises the parallel bars B, which are held apart, as shown, by blocks $a$, which are interposed between them at intervals in their length.

Connected at an intermediate point in its length between the lower ends of the bars B by a bolt $b$ is a horizontal anchor-bar C, having an extension $D^2$, whereby rock or other substances can be piled thereon, so as to keep the post in position, said post being connected at its outer end between the lower ends of the vertically-oblique parallel brace-rods C' by a bolt $c$. These parallel brace-rods C', which are held apart or spread by blocks $d$, interposed between them at intermediate points in their length, straddle the bars B, adjacent to the upper ends thereof, and are connected to said bars by a transverse bolt $c'$, as shown.

D indicates a horizontal anchor-bar, which extends at right angles to the bar C and is designed to serve in conjunction therewith to enable the post to withstand strain in various directions. This anchor-bar D is provided at its inner end with an angular branch $m$, through which the bolt $b$ passes, and it is connected by a bolt $f$ at its outer end between the lower ends of the vertically-oblique parallel brace-bars D'. These brace-bars D', which are held apart or spread by blocks $g$, interposed between them at intervals in their length, straddle the bars B immediately below the brace-bars C', and are connected to said bars B by a bolt $d'$, as illustrated.

Formed at suitable intervals in the bars B of the upright A are the horizontally-disposed aligned apertures $i$, which are of a size to permit of the free passage of the threaded shanks $j$ of the wire-tightening hooks E, to which the wires may be connected in the ordinary manner. These shanks $j$ of the hooks E carry nuts or burrs F upon their free portions, through the medium of which the wires may be readily tightened or loosened.

In practice the post is planted about two feet deep in the ground, and stones of sufficient size are placed beneath the outer ends of the anchor-bars C and D in order to prevent the same from sinking. A suitable number of stones is then interposed between the bars C D and the brace-bars C' D' to the surface of the ground, whereby it will be readily perceived that the upright A will be rigidly held and enabled to resist a great amount of strain in all directions.

In Fig. 2 of the drawings I have illustrated a post which is more especially adapted for corner purposes. Referring to said figure, A' indicates the hollow upright, which is preferably of a circular form in cross-section and is provided at intervals in its length at diametrically-opposite points with horizontally-disposed aligned apertures $n$ for the passage of the securing-wires $p$, which are twisted around the line-wires and serve to securely fasten the same, as shown.

Suitably connected to the upright A' are anchor-bars $C^2 D^2$, which are disposed at right angles to each other for the purpose before stated, the bar $D^2$ having an extension $D^3$, whereby rock or other substances can be piled thereon, so as to keep the post in position. These anchor-bars $C^2 D^2$ have their outer ends connected to the lower ends of the vertically-oblique brace-bars $C^3 D^3$, which are braced and connected at an intermediate point in their length by a cross-bar K and are connected at their upper ends to the upright A', as shown.

In Fig. 3 of the drawings I have illustrated an ordinary line-post, which is similar in construction to that shown in Fig. 2, with the exception that it has but one anchor-bar $C^4$ and one brace-bar $D^4$. The line-wires may be connected to the upright $A^2$ of this latter construction in any approved manner, although I prefer to employ the securing-staples, as illustrated, which, though they securely hold the wires to the post, permit the same to be tightened when desirable.

From the foregoing description, taken together with the drawings, it will be readily perceived that I have provided a post of a construction adapted to be readily and firmly anchored in the ground and embodying devices whereby a ready and secure detachment of the line-wires may be effected.

Having thus described my invention, what I claim, and desire to secure by Letters Patent, is—

1. In a fence-post, the combination, with the spaced vertical bars B and the anchor-bars C and D, interposed and secured between the spaces of the lower ends of the bars B, of the spaced bars C' D', arranged on opposite sides of the outer ends of the anchor-bars and secured thereto, the upper ends of said bars C' D' secured on opposite sides of the bars B and arranged at right angles thereto, substantially as and for the purposes specified.

2. In a fence-post of the character described, the combination, with the spaced vertical bars B, provided with a series of openings formed therein, of the threaded tightening-hooks E, passing through said openings, with nuts F thereon, substantially as and for the purposes specified.

In testimony whereof I affix my signature in presence of two witnesses.

DANIEL HINESLEY.

Witnesses:
 PERRY W. FORD,
 JOHN C. FARBER.